US008295303B2

(12) United States Patent
Demaria et al.

(10) Patent No.: US 8,295,303 B2
(45) Date of Patent: Oct. 23, 2012

(54) SYSTEM AND METHOD FOR TRANSMISSION OF FRAME RELAY COMMUNICATIONS OVER A DIGITAL SUBSCRIBER LINE EQUIPPED WITH ASYNCHRONOUS TRANSFER MODE COMPONENTS

(75) Inventors: Robert L. Demaria, Elizabeth, CO (US); Colleen M. Green, Aurora, CO (US); Donald B. Roberts, Aurora, CO (US)

(73) Assignee: Verizon Business Global LLC, Basking Ridge, NJ (US)

( * ) Notice: Subject to any disclaimer, the term of this patent is extended or adjusted under 35 U.S.C. 154(b) by 3209 days.

(21) Appl. No.: 10/109,643

(22) Filed: Apr. 1, 2002

(65) Prior Publication Data

US 2002/0159462 A1 Oct. 31, 2002

Related U.S. Application Data (60) Provisional application No. 60/279,669, filed on Mar. 30, 2001.

(51) Int. Cl.
*H04J 3/22* (2006.01)
*H04L 12/28* (2006.01)
*H04L 12/66* (2006.01)

(52) U.S. Cl. .................. 370/466; 370/401; 370/352

(58) Field of Classification Search .................. 370/401, 370/466

See application file for complete search history.

(56) References Cited

U.S. PATENT DOCUMENTS

| 5,896,383 | A  | * | 4/1999  | Wakeland .................. 370/400 |
| 6,028,867 | A  |   | 2/2000  | Rawson et al. |
| 6,081,517 | A  |   | 6/2000  | Liu et al. |
| 6,084,881 | A  |   | 7/2000  | Fosmark et al. |
| 6,108,350 | A  | * | 8/2000  | Araujo et al. ................. 370/467 |
| 6,243,394 | B1 | * | 6/2001  | Deng ............................. 370/466 |
| 6,252,887 | B1 | * | 6/2001  | Wallace ....................... 370/466 |
| 6,349,096 | B1 | * | 2/2002  | Liu et al. ....................... 370/352 |
| 6,751,224 | B1 | * | 6/2004  | Parruck et al. ............. 370/395.6 |
| 6,826,620 | B1 | * | 11/2004 | Mawhinney et al. ......... 709/235 |
| 6,904,054 | B1 | * | 6/2005  | Baum et al. .................... 370/467 |
| 7,103,001 | B1 | * | 9/2006  | Cordsmeyer et al. ......... 370/241 |
| 7,593,414 | B2 | * | 9/2009  | Jones et al. ................... 370/401 |
| 7,990,984 | B2 | * | 8/2011  | Carew et al. .................. 370/401 |
| 2002/0006130 | A1 | * | 1/2002 | Tai et al. ..................... 370/395.2 |
| 2002/0023258 | A1 | * | 2/2002 | Elwahab et al. .............. 717/122 |
| 2002/0027920 | A1 | * | 3/2002 | Tai et al. ..................... 370/395.6 |
| 2002/0131422 | A1 | * | 9/2002 | Chu et al. ...................... 370/397 |
| 2005/0030973 | A1 | * | 2/2005 | Kitamura ..................... 370/466 |

OTHER PUBLICATIONS

Lane, J., "Personal Broadband Services: DSL and ATM", Virata, 1998.
"Frame Relay/ATM PVC Service Interworking Implementation Agreement FRF.8.1", Frame Relay Forum Technical Committee, Feb. 28, 2000.

(Continued)

*Primary Examiner* — Warner Wong (57) ABSTRACT

A system and method for transmitting Frame Relay based communication over an ATM based network that includes a DSL link are disclosed. The Frame Relay based communication is mapped into ATM cells at a Digital Subscriber Line Access Multiplexer (DSLAM). The mapping of the Frame Relay frames into ATM cells is carried in accordance with transparent mode or translation mode functionality provided in the DSLAM. The Frame Relay data may be mapped into the ATM cells pursuant to FRF.5, FRF.8, FRF.8.1, or other similar standards. The system and method may enable transparent propagation of the Frame Relay data across the DSL/ATM network, for receipt on the other end of the network by a Frame Relay compatible switch, or an ATM compatible switch.

18 Claims, 5 Drawing Sheets

OTHER PUBLICATIONS

"Frame Relay/ATM PVC Service Interworking Implementation Agreement FRF.5", Frame Relay Forum Technical Committee, Dec. 20, 1994.

"Frame Relay/ATM PVC Service Interworking Implementation Agreement FRF.8", Frame Relay Forum Technical Committee, Apr. 14, 1995.

* cited by examiner

SYSTEM AND METHOD FOR TRANSMISSION OF FRAME RELAY COMMUNICATIONS OVER A DIGITAL SUBSCRIBER LINE EQUIPPED WITH ASYNCHRONOUS TRANSFER MODE COMPONENTS

CROSS-REFERENCE TO RELATED APPLICATIONS

The present application is related to and draws priority on prior U.S. provisional patent application Ser. No. 60/279,669, filed Mar. 30, 2001, and entitled: System and Method for Frame Relay and Asynchronous Transfer Mode Date Transmission Over a Digital Subscriber Line, which application is incorporated herein in its entirety by reference.

FIELD OF THE INVENTION

The present invention relates to a system and method for carrying out end-to-end Frame Relay communications over an ATM based network including a DSL link.

BACKGROUND OF THE INVENTION

It is clear that the Internet, which is the widest of all wide area networks, is the most important development in computing and communications in modern history. The Internet allows home and business computers located throughout the world to communicate with each other. Communication between these computers is possible as the result of the connection of many large computer networks tied together to form the Internet. Modern advancements have resulted in the development of very high speed equipment for use in carrying out Internet communications. The large computer networks that make up the Internet may be connected to each other using high speed backbone data links such as T-1, T-3, OC-1, and/or OC-3 links that are capable of transmitting data at rates on the order of megabits per second. It is also not uncommon for home computers to have processing speeds on the order of a gHz, and for businesses to have direct links to an Internet backbone.

Despite all these advances however, it has become painfully obvious that speed of communication over the Internet will always be limited by the speed of the slowest piece of equipment or communication link in the chain connecting the communication end points to the Internet backbone. Absent the special installation of a direct high-speed data link, such as a T-1 line, an end user PC's connection to the Internet is often initially made through the existing telephone line infrastructure. Existing telephone links comprise a twisted pair of copper wires running from each phone jack in a building to a local central office. Communication from the central offices to telephone switching centers is typically made with a higher speed link, such as an optical fiber connection. These higher speed links exist throughout the remainder of the network, but do not extend past the local central offices.

Presently, the most problematic bottleneck for Internet communication exists in the twisted copper pair link from a home or business PC to a traditional telephone central office. Twisted copper pairs were originally designed to carry analog communications, i.e., voice communication. In modern times however, communication needs have gone beyond just voice and require the transmission of data, preferably in a digital form. The technology to transmit digital data using an analog signal has existed for decades in the form of modem technology. As the years have gone by, modems have become faster and faster in an attempt to keep pace with the increase in the speed of other network components. Modem developers have finally reached an inherent limitation on the amount of data that can be carried on a twisted copper pair using an analog signal. This limitation arises from bandwidth constraints growing out of the fact that the analog channel used for modem communications is only 4 kHz wide. As a result, the best modems today are able to transmit data at a rate of 56 Kilobytes per second, provided that conditions are nearly perfect. With PC's operating at the GHz level and digital switches and T-1 lines operating at the MHz level, this clearly makes the modem based link between a home or business PC and the central office the slowest link in the Internet or other wide area network communication scheme. Accordingly, there is a need to provide a higher rate of communication over the existing infrastructure, namely the twisted pair of copper wires linking most homes and businesses with local central offices.

The desired higher rate communication over twisted copper pairs may be provided by a relatively new technology called Digital Subscriber Line (DSL) Technology, often referred to as xDSL where the x signifies different variations of DSL. DSL may allow the twisted copper pair to transmit digital information at rates between 128 kilobytes per second to as high as several megabytes per second. A detailed description of DSL Technology may be found in the publication "Personal Broad Band Services: DSL and ATM" by Jim Lane and published by Virata in 1998, which is hereby incorporated by reference.

The concept behind DSL is as follows. Voice communications over the twisted copper pair are carried out in a frequency range below 4,000 hertz because most human voices operate at less than 4 kHz. A twisted copper pair, however, is capable of transmitting higher frequency signals. The frequency range above 4 kHz, heretofore unused, can now be used by DSL equipment to send digital signals between homes and businesses and local central offices. What's more, because the DSL frequencies do not overlap with the voice frequencies, DSL communication and voice communication can occur simultaneously over the same copper pair facility.

There is a catch to the use of DSL, however. The higher frequency signals used to transmit DSL communications degrade as the distance between the end phone jack and the central office increases. This degradation is the product of both the distance and the increasing number of "taps" on the line that occurs with increasing distance. True highspeed DSL service (greater than 128 kbps) cannot be carried out when the "wire distance" between the end user and the central office is more than about three (3) miles. Luckily, central offices have been built throughout the United States such that most phone jacks are within a few miles "wire distance" of their respective central office.

As noted briefly above, in recent times there have also been important advances in the equipment (particularly in the switching technology and regimes) that is used at the central office and at other nodes further upstream headed towards the large Internet or other private networking hubs. Some of the most important advancements have involved packet type switching.

A packet is a generic term for a bundle of data that is organized in a specific way to facilitate its transmission over a network. Packets, also sometimes referred to as blocks, frames, or cells, primarily comprise three types of information: the payload, the header, and the trailer. Usually the largest part of a packet contains the payload, i.e., the data that is to be communicated. The header may be attached to the front of the payload. The header includes additional digital data that tells the network where the packet should be sent and in some instances the route that it should take. The trailer may contain data used to detect and correct errors in the payload that occur during transmission.

The broad category of packets may be further divided into subcategories of variable length packets and fixed length packets. The transmission of variable length packets is synonymous with "frame relay" transmission. Frame relay services employ a form of packet switching that is similar to that used for X.25 networks. In frame relay, the packets are in the form of frames that may vary widely in length between 0 and 4,096 octets. Because of the large variability in the size of "frame relay" frames, they are very suitable for the transmission of data that is not time sensitive. For example, frame relay is not well suited for the transmission of digital voice information because frames are designed to deliver large chunks of digital data but at less frequent intervals. Digital voice requires the transmission, at a regular pace, of little pieces of data that may be used to reassemble a voice communication after its transmission over at network. Frame relay applications most often include private data traffic transmission as a replacement to leased line services, such as T1.

Fixed length packets are the logical choice for digital data transmission when variable length packets are non-optimal. The most prevalent type of fixed length packets that are presently used are ATM packets which have a cell length of 53 bytes, 48 of which are for the payload. ATM is primarily used for LAN-to-LAN (Local Area Network) applications, carrier traffic aggregation and digital voice and video technology transmission. As a result, ATM packets are universally useful, and ATM compatible components are commonly used for highspeed networks, such as those that link with and comprise the Internet.

A significant number of end user PC's are equipped to carry out communications using Frame Relay protocol as opposed to ATM protocol. When these PC's are connected together on a local network with Frame Relay compatible components, they are able to easily communicate with each using Frame Relay packets. In modern times, however, there is an ever increasing need for end user PC's to communicate with other end users over wide area networks, including the Internet. Because these wide area networks are typically equipped with ATM compatible components, such as concentrators and switches, Frame Relay based communications could not be readily carried out over the wide area networks. In response to this problem, an industry group called the Frame Relay Forum (FRF) formulated standards to govern the transmission of Frame Relay packets over other broadband technologies, such as ATM based networks. The inventors of the present invention are familiar with three such standards in particular, FRF.5, FRF.8, and FRF.8.1, which pertain to standards for the transmission of Frame Relay packets and the interfacing of Frame Relay products with ATM based networks. These standards are available from the Frame Relay Forum, and are published in *Frame Relay/ATM PVC Network Interworking Implementation Agreement FRF.5*, The Frame Relay Forum (Dec. 20, 1994); *Frame Relay/ATM PVC Network Interworking Implementation Agreement FRF.8*, The Frame Relay Forum (Apr. 14, 1995); and *Frame Relay/ATM PVC Service Interworking Implementation Agreement FRF.8.1*, Frame Relay Forum Technical Committee (Feb. 28, 2000), each of which is incorporated herein by reference in its entirety.

In view of the importance of both DSL technology, and the transmission of Frame Relay communications over ATM based networks, for end-to-end high speed wide area and/or Internet communication, there is a need for a system and method that integrates DSL and Frame Relay over ATM network communications. To date, there have been some developments in integration of DSL with Frame Relay or ATM systems for aggregation purposes; however, there has not been a commercially successful marriage of all three.

An example of a DSL system that is adapted to transmit data through an ATM or a Frame Relay switch is described in U.S. Pat. No. 6,028,867 to Rawson et al. (Feb. 22, 2000), which is hereby incorporated by reference. The Rawson patent describes a network structure in which home PCs are connected to a Digital Subscriber Line Access Multiplexer (DSLAM) located in a central office. The DSLAM includes both an Asynchronous DSL (ADSL) multiplexer and an ISDN based DSL (IDSL) multiplexer. The IDSL multiplexer provides bandwidth of up to 128 kbps, but is not limited by the distance between the home PC and the central office. The ADSL multiplexer provides bandwidth of up to 6.1 Mbps in the direction from the central office to the home PC, and up to 640 kbps in the reverse direction so long as the local loop connecting the home PC to the central office is less than about 14,000 feet in length. The DSLAM is connected to a remote target (e.g. an Internet destination) through a generic data switch. The Rawson patent does not disclose a system or method for providing Frame Relay communication over an ATM based network that includes a DSL link.

Another example of a DSL system that is adapted to be used with a packet switched network is described in U.S. Pat. No. 6,081,517 to Liu et al. (Jun. 27, 2000), which is hereby incorporated by reference. The Liu patent discloses a broadband DSL service provider's network. Liu describes the equipment necessary to provide an end-user of a xDSL service with a connection at a greater speed than traditional remote access, or Internet access methods. The key differentiator in the Liu patent from the above-referenced Rawson patent and the below-referenced Fosmark patent is the description of a dynamic bandwidth allocation service on a "call by call" basis. The Liu patent states that end-users may dynamically request bandwidth from the network as the application needs change, and for those allocations to be based upon efficient network routing and cost models. Thus, from Liu it is inferred that the customer takes an active role in determining the cost to him/her based upon the bandwidth needed for the application being "called" from some content located on the network. Additionally, the Liu patent infers that the network dynamically chooses "the PSTN 250 or WAN 260, or setting up a virtual circuit via the WAN" based upon the needs of the end-user. While the Liu patent discloses a typical DSL link, generally, it does not disclose a DSL link that is capable of transmitting Frame Relay communications over an ATM equipped network.

Still another example of a DSL system is described in U.S. Pat. No. 6,084,881 to Fosmark et al. (Jul. 4, 2000), which is hereby incorporated by reference. The Fosmark patent discloses an endpoint (or CPE, Customer Premises Equipment) that uses an auto-negotiation function with the DSLAM to assign protocols associated with various packet and cell mode transmissions. Unlike the Liu and Rawson patents which describe an xDSL service provider's network, the Fosmark patent describes a specific piece of equipment in an xDSL network and is written on the behalf of an equipment manufacturer.

Therefore, there is a need for a system and method of connecting end users that employ Frame Relay communications to ATM host networks in a system that includes a DSL link. In response to these needs, the present applicants have developed a Frame Relay over xDSL product that may be used in association with an ATM based network.

SUMMARY OF THE INVENTION

In response to the foregoing challenges, applicants have developed an innovative system for transmitting a Frame Relay based communication over an ATM based network that includes a DSL link, comprising: an end user computer; a DSL compatible Customer Premises Equipment (CPE) device operatively connected to the end user computer; a Digital Subscriber Line Access Multiplexer (DSLAM) operatively connected to the CPE device; an ATM network operatively connected to the DSLAM at a first end; and a Frame Relay capable switch connected to the ATM network at a second end, wherein the DSLAM is adapted to map Frame Relay based communication frames into ATM cells for transmission over the ATM network.

Applicants have further developed an innovative method for transmitting a Frame Relay based communication over an ATM based network that includes a DSL link, comprising: transmitting a Frame Relay based communication from a DSL compatible Customer Premises Equipment (CPE) device to a Digital Subscriber Line Access Multiplexer (DSLAM); mapping the Frame Relay based communication into ATM cells at the DSLAM; transmitting the ATM cells across an ATM network to a Frame Relay capable switch; and recovering the Frame Relay based communication from the ATM cells at the Frame Relay capable switch.

Still further, applicants have developed an innovative method for transmitting a Frame Relay based communication over an ATM based network that includes a DSL link, comprising: transmitting a Frame Relay based communication from a DSL compatible Customer Premises Equipment (CPE) device to a Digital Subscriber Line Access Multiplexer (DSLAM); mapping the Frame Relay based communication into ATM cells at the DSLAM; transmitting the ATM cells across an ATM network to an ATM capable switch; and recovering the Frame Relay based communication from the ATM cells at the ATM capable switch.

It is to be understood that both the foregoing general description and the following detailed description are exemplary and explanatory only, and are not restrictive of the invention as claimed. The accompanying drawings, which are incorporated herein by reference and which constitute a part of this specification, illustrate certain embodiments of the invention, and together with the detailed description serve to explain the principles of the present invention.

BRIEF DESCRIPTION OF THE DRAWINGS

The invention will be described in conjunction with the following drawings in which like reference numerals designate like elements and wherein.

DETAILED DESCRIPTION OF THE INVENTION

Figure 1:
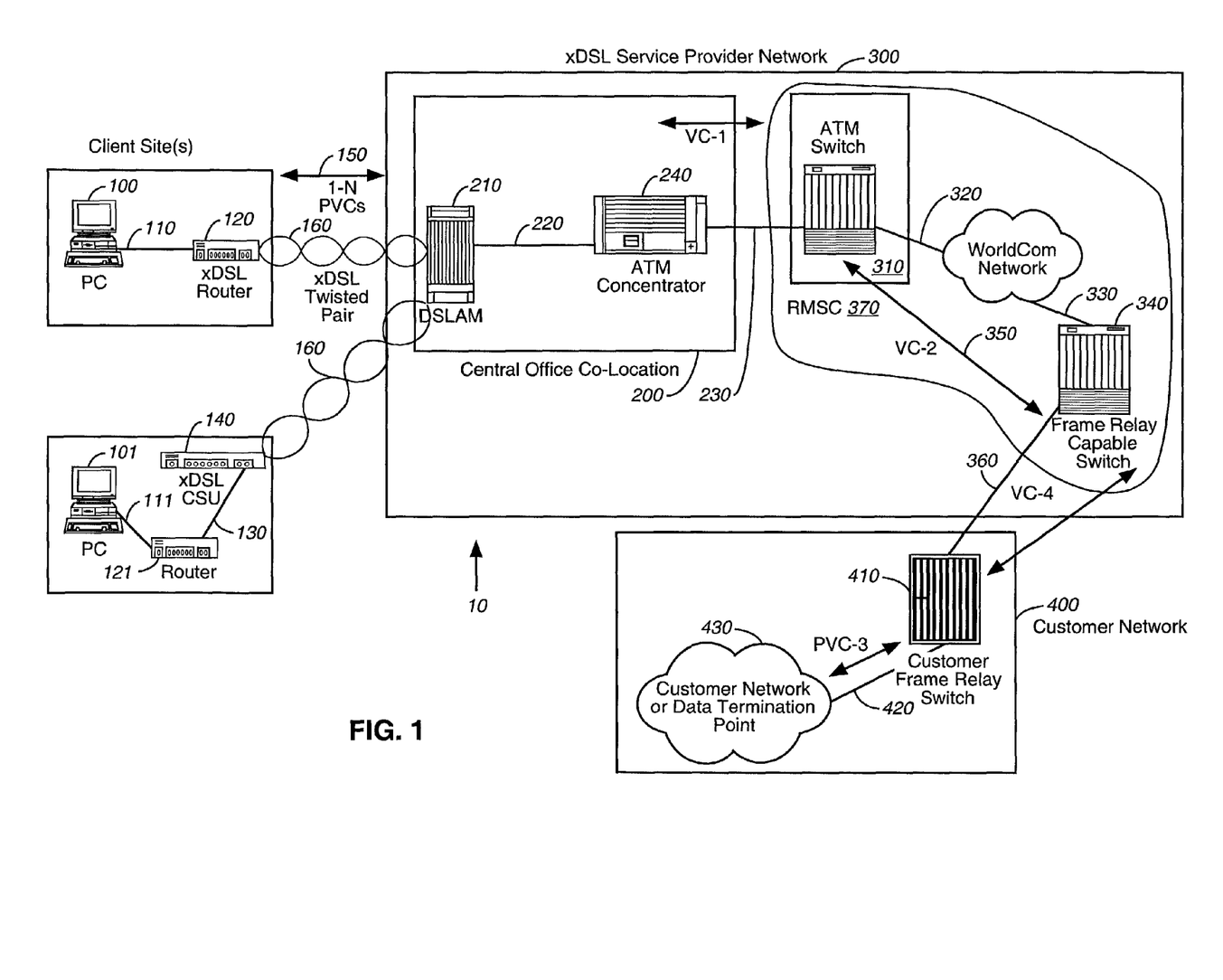
FIG. 1 is a schematic diagram of an embodiment of the invention showing the interconnection of the hardware that may be used for Frame Relay/ATM interworking to a Frame Relay termination point in a network including a DSL link.

The first embodiment of the invention is described in connection with FIG. 1, which shows a network or system 10 for carrying out ATM/Frame Relay based data communications between computers 100 and 101 (e.g. PCs) and communication destinations such as a customer's private Frame Relay network 400. Two alternative ways are shown in FIG. 1 to connect the PCs 100 and 101 to the DSLAM 210 in the Central Office 200.

The first PC 100 is connected by a 10/100 BaseT connection 110 to a Customer Premises Equipment (CPE) device, which is an xDSL router 120. The CPE device 120 is connected to a DSLAM 210 via a twisted pair of copper wires 160. The second PC 101 is connected to a router 121, e.g. a V.35 compatible router, via a 10/100 BaseT connection 111. The router 121, in turn, is connected via a connection 130 to an xDSL compatible DSU 140. The DSU 140 is connected to the DSLAM 210 via a twisted pair of copper wires. There are several equipment manufacturers, such as Netopia, Alcatel, and 3COM, that make xDSL compatible routers 120. There are also several equipment manufacturers, such as Cisco, Alcatel, and Lucent that make the V.35 compatible routers 121.

The DSLAM 210 is the first device encountered from the PC 100 end of the network that is part of the xDSL service provider network 300. The function of the DSLAM 210 is to multiplex communications received from one or more CPE devices 120 and/or 140 into a single data stream at the Central Office 200. Providers of DSLAM equipment include Cisco, Paradyne, Alcatel, Lucent, and Copper Mountain.

According to an embodiment of the present invention, DSLAM 210 can be provided with Interworking Functionality that enables it to not only multiplex DSL signals received from the CPEs 120 and 140, but also multiplex Frame Relay based DSL signals in a manner that allows them to be sent over an ATM based network. The Interworking Functionality that enables Frame Relay/ATM compatibility may be provided through implementation of FRF.5, FRF.8, or FRF.8.1 standards by the DSLAM 210. Essentially, the DSLAM 210 allows the variable length Frame Relay frames originating with the PC 100 to be broken down, if need be, and mapped and inserted into ATM cells for propagation across the service provider network 300. As a result, Frame Relay data originating from the PC 100 can be sent to a distant Frame Relay compatible device over an ATM based network. The DSLAM 210 is discussed in more detail below.

The xDSL circuit comprising the CPEs 120 and 140, and the DSLAM 210 may employ Layer 2 technology, where Layer 2 is the Data Link layer in accordance with the Open Standards Interconnection model, and wherein Layer 2 is concerned with the procedures and protocols for operating communications lines. The Layer 2 technology employed by the xDSL circuit may provide multiple Virtual Channels (VCs) 150 (or Permanent Virtual Connections (PVCs)), connecting the CPEs 120 and 140 with the DSLAM 210 and the aggregation and end-user equipment connected to it.

The DSLAM 210 may be connected to an ATM concentrator 240 by a high data-rate connection such as a DS-3 or OC-3 link 220. The ATM concentrator 240 may be used to aggregate signals of originating from multiple DSLAM devices. Both the DSLAM 210 and the ATM concentrator 240 may be located in a central office 200. Manufacturers that provide ATM concentrators include Alcatel, Cisco, and Lucent.

In turn, the ATM concentrator 240 may be connected to an ATM switch 310 by another high-data rate connection such as a DS-3 or OC-3 link 230. Manufacturers of ATM switching equipment include Cisco, Alcatel, and Lucent. The ATM switch 310 may be connected to a Frame Relay capable switch 340 using ATM capable (i.e. high data-rate) connections 320 and 330 such as DS-3 or OC-3 links.

The Frame Relay capable switch 340 at the edge of the xDSL Service Provider's Network 300 may be connected to a Frame Relay capable switch 410 located on the edge of the customer's network 400 to provide connectivity to a corporate site or to the Internet backbone 430. The connection 360 between the xDSL service provider network 300 and the customer network 400 may be a DS-1, DS-3, or OC-X connection. The xDSL service provider's Frame Relay capable switch 340 may be equipped with Interworking Functionality (in accordance with FRF.5, FRF.8, or FRF.8.1 standards) that enables it receive the Frame Relay data that has been transmitted over the largely ATM based network 300. Implementation of Interworking Functionality at the Frame Relay capable switch 340 is considered conventional, and accordingly is not explained in detail here.

The virtual channel(s) 150 established over the twisted copper pair 160 may be propagated through each link (160, 220, 230, 320, 330, 360, and 420) of the overall network 10, so that continuous communication can occur over the network between the PCs 100 and 101 and the destination 430. Even though the data traffic to and from the PCs 100 and 101 is carried using different protocols (e.g. IP, ATM, and Frame Relay), there is no loss in data as a result of the built in Frame Relay/ATM compatibility of the DSLAM 210 and the Frame Relay capable switch 340.

With respect to the operation of the network 10 shown in FIG. 1, the interconnection between the xDSL service provider network 300 and the customer Frame Relay network 400 takes place between two Frame Relay capable switches, 340 and 410, respectively. The xDSL service provider may have several switches 310 and 340 in a Regional Metro Servicing Center (RMSC) 370 at the edge of the xDSL service provider network 300. Frame Relay data traffic originating on the LAN-side of the DSL CPEs 120 and 140, traverses the DSLAM 210, the ATM concentrator 240, the ATM switch 310, and the Frame Relay capable switch 340. At the RMSC 370, the data traffic may be aggregated over many central offices 200 into one or more data streams over the xDSL service provider network 300 where it may leave the network at a Frame Relay capable switch 340. After traversing over the xDSL service provider network 300, the data stream may enter the customer network 400 at the customer Frame Relay network switch 410.

Figure 5:
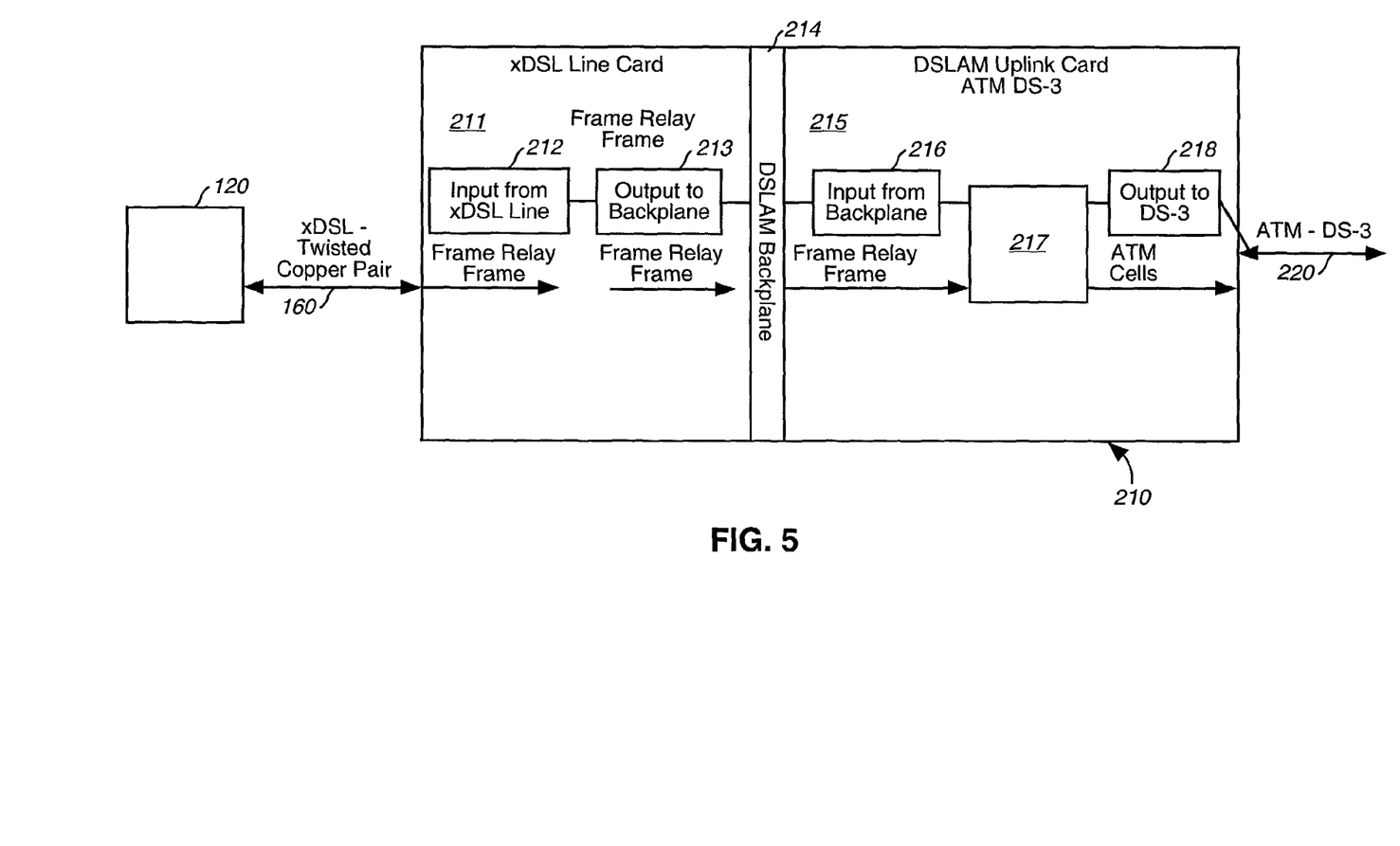
FIG. 5 is a schematic diagram of a DSLAM showing one configuration that may be used in an embodiment of the invention.

The mapping of Frame Relay frames to ATM cells by the xDSL service provider enables the Frame Relay data to be carried from the service demarc connections 110 and 111, across the xDSL service provider network 300 to the DS-1, DS-3, or similar interconnects to the customer network 400. This mapping occurs at the DSLAM 210. An example of a DSLAM 210 that has been constructed and provided with the necessary functionality to perform the mapping is shown functionally in FIG. 5. With reference to FIG. 5, the DSLAM 210 may include an xDSL line card 211 with an input port 212 and an output port 213, a DSLAM backplane 214, and a DSLAM uplink card 215 with an input from the backplane 216, a processing device for mapping Frame Relay frames into ATM cells 217, and an output to an ATM connection 218. The processing device 217 is programmed to map the Frame Relay frames received from the CPE device 120 into ATM cells for transmission on the ATM connection 220.

With renewed reference to FIG. 1, Frame Relay and/or ATM QoS (Quality of Service) parameters are maintained by the assignment of appropriate service parameters throughout the overall network 10 from the CPE devices 120, 121, and 140 through the ATM switches 310 and 340. End-to-end QoS in the xDSL service provider network 300 enables provisioning of specified data throughput values on a per PVC basis in accordance with the Frame Relay and ATM service provider's existing provisioning methodology. The DSLAM 210 may perform LMI-to-ATM Operation, Administration, and Maintenance (OA&M) F5 data flow conversion as needed to assure that the end user PC 100 customer router status is propagated through the network 10 back to the customer network 400. This may also ensure that up/down VC status is visible from the end user router (CPE 120) and may allow end-to-end or segmented loopback functionality and monitoring from the customer network 400.

The DSLAM 210 may be configured so that the xDSL service provider network 300 delivers a guaranteed CIR (Committed Information Rate) for each customer traffic-carrying PVC 150 that extends through the xDSL service provider network.

The customer network 400 may provide any of three different xDSL end-to-end services. The first two types of services are explained with reference to FIG. 1. With reference to FIG. 1, the network 10 is configured such that Frame Relay communication frames may be propagated through the service provider network 300 in a transparent mode. Two different types of transparent mode transmission are possible; FRF.5 over ATM AAL5 (ATM Adaptation Layer), and FRF.8 transparent mode (collectively referred to as "transparent mode transmission"). FRF.5 over ATM AAL5 and FRF.8 transparent mode standards may be used to provide end-to-end networking between the Frame Relay based CPE devices 120 and 140 and the customer network Frame Relay based termination point 430. Selection of transparent mode transmission is made by configuring the DSLAM 210 to carry out the mapping of Frame Relay frames in accordance with the FRF.5 over ATM AAL5 or the FRF.8 transparent mode standards.

When transparent mode transmission is selected, the presence of the ATM based network 300 between the CPE devices 120/140 and the Frame Relay based customer network 400 is not "felt" by the equipment at the customer termination point 430. In essence, the ATM based network 300 is "transparent" to the Frame Relay equipment on the terminal ends of the ATM network. ATM/Frame Relay interworking functions in the xDSL service provider network at the DSLAM 210 and the Frame Relay capable switch 340 provide the necessary functions to transport the Frame Relay data across the ATM network without loss of integrity and with the maintenance of PVC management function.

The use of FRF.5 transparent mode service is desirable to Frame Relay customers that want to keep their end users configured as Frame Relay users. FRF.8 transparent mode service performs similarly to FRF.5 transparent mode service, with a difference being that the customer with FRF.8 the user at the customer network 400 does not receive additional information in the form of Backward Explicit Congestion Notification (BECN) and Command/Response (C/R) bits in the Frame Relay header. The BECN functionality is lost when using FRF.8 transparent mode because FRF.8 call for the entire 2 bytes of the Frame Relay Header to be copied into the ATM cell stream, as is required for FRF.5 transparent mode. It is expected that FRF.8 transparent mode might be used in situations where one of the Frame Relay devices, either the DSLAM 210 or the Frame Relay capable switch 340 in FIG. 1 does not support FRF.5 transparent mode, or in the event there are compatibility issues between vendors on implementation of FRF.5. In both FRF.5 and FRF.8, all of the terminal devices 120, 121 and 430 are Frame Relay capable devices.

Figure 3:
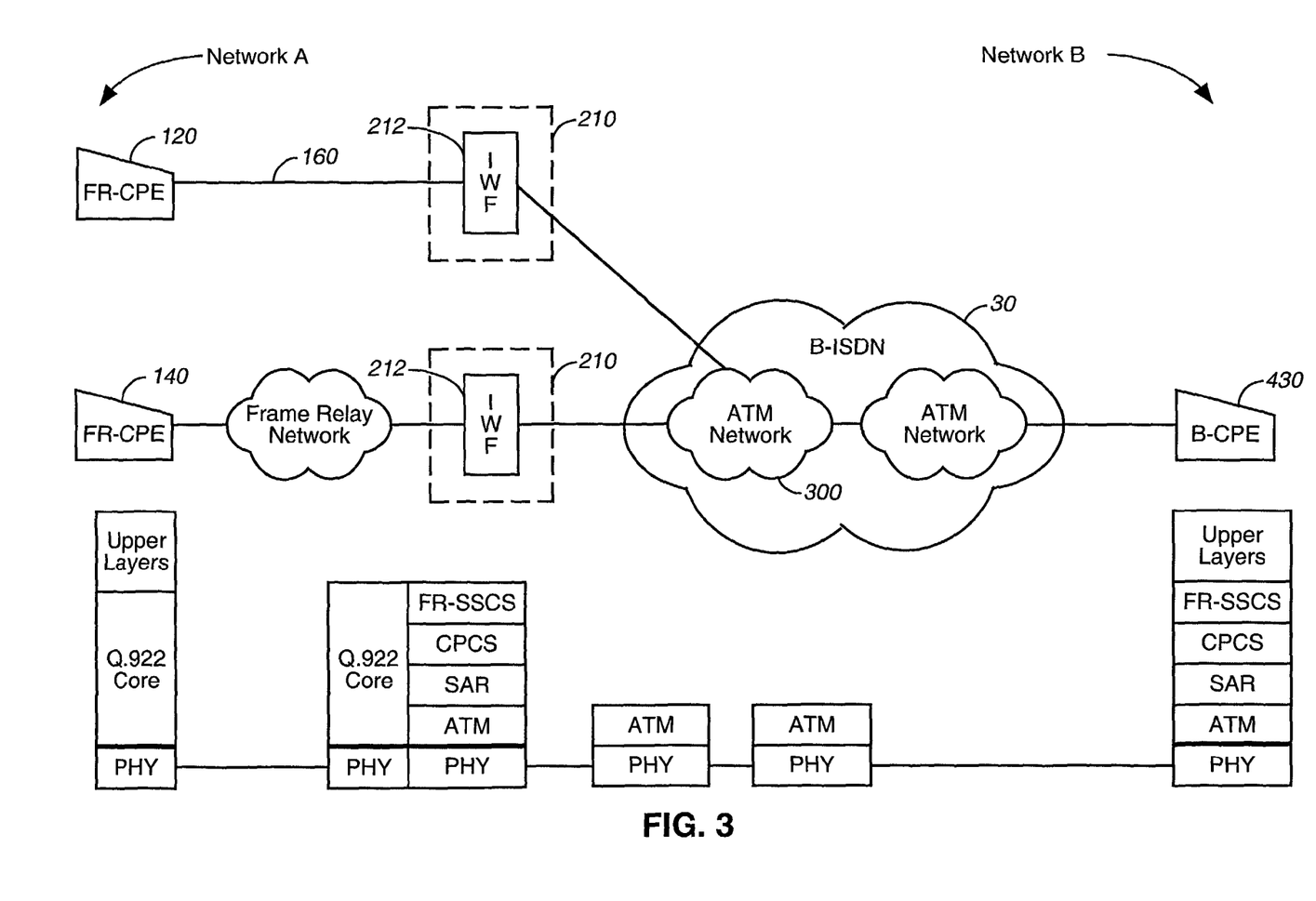
FIG. 3 is a schematic diagram further illustrating an embodiment of the invention.

FIG. 3 illustrates a first network interworking example between Frame Relay networks over a Broadband-integrated Services Digital Network (B-ISDN) 30 that includes multiple ATM networks such as the service provider network 300. The upper portion of FIG. 3 shows the physical connection of network components, while the bottom portion of FIG. 3 shows the corresponding communication layers involved for each link of the network. All interworking between Frame Relay and the B-ISDN network is done by the Interworking Functions (IWF) 212 in the DSLAMs 210 and the Frame Relay capable switch (340 in FIG. 1). The Interworking Functions of these devices may comply with ITU-T Recommendations 1.555 and 1.365.1. The B-ISDN transport of the Frame Relay traffic over the xDSL service provider network is transparent to the customer. Implementation of FRF.5 transparent mode permits the status of the CPEs 120 and 140 to be sent over the B-ISDN network to provide the customer network (400 in FIG. 1) with insight into such status, which is a desirable feature for some customers.

Figure 2:
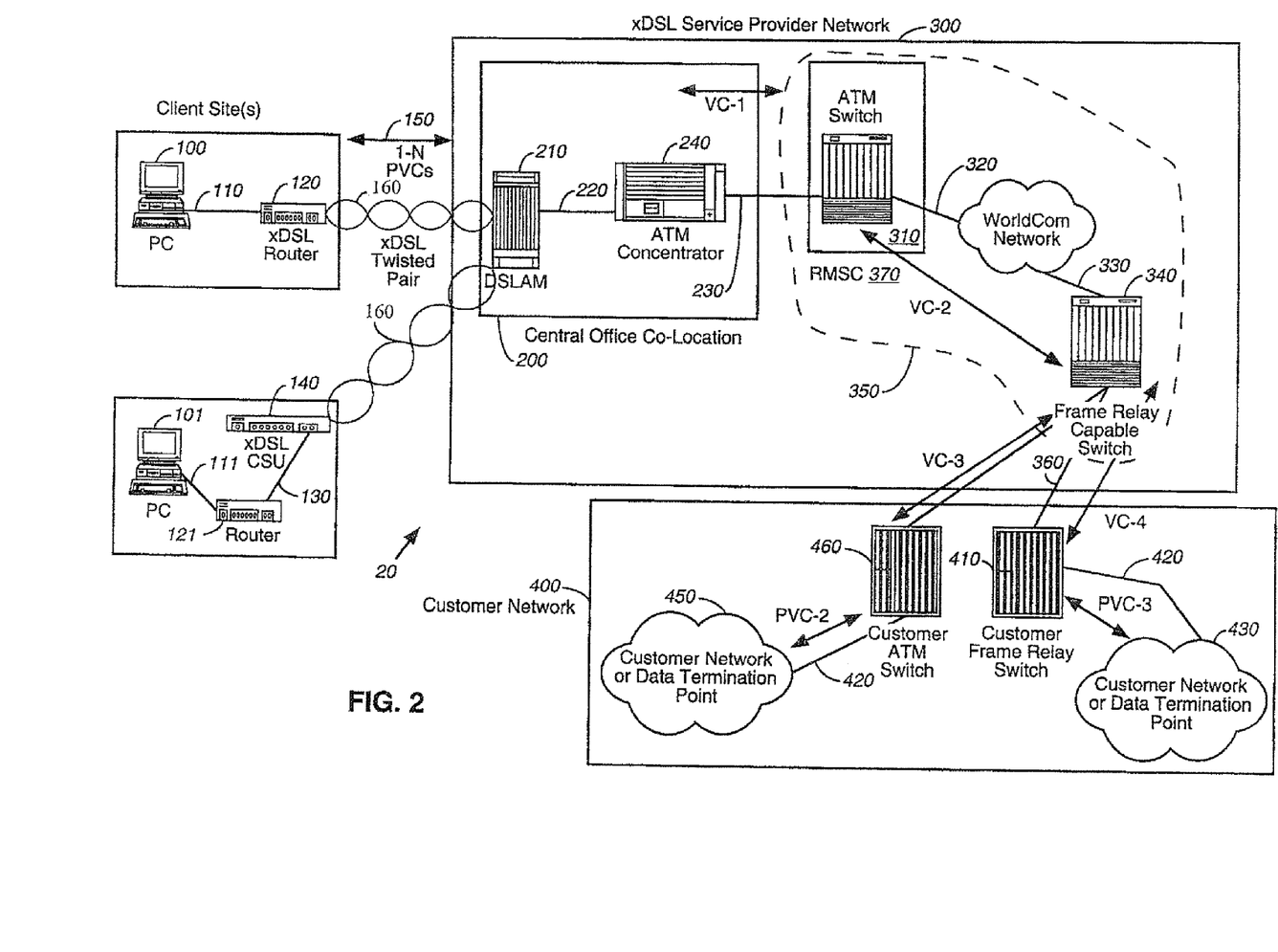
FIG. 2 is a schematic diagram of an alternate embodiment of the invention showing the interconnection of the hardware that may be used for Frame Relay/ATM service interworking to both ATM and Frame Relay termination points in a network including a DSL link.

A second embodiment of the invention is described in connection with FIG. 2, in which like reference characters refer to like elements, and in which the overall network 20 provides service using a hybrid network model that may include Frame Relay and/or ATM host-site terminations, 430 and 450, respectively. The overall network 20 differs from the overall network 10 in FIG. 1 in that it further includes a customer ATM switch 460, and an ATM based customer termination point 450. The data flow and connectivity between devices in the overall network 20 of FIG. 2 is similar to that discussed in connection with the overall network 10 in FIG. 1. The difference between the networks is that the customer has the option of providing service from the Frame Relay capable CPE devices 120 and 121 to either a Frame Relay capable termination point 430 or to ATM capable termination points 450 in the network 20 shown in FIG. 2.

With continued reference to FIG. 2, end users whose access needs include Frame Relay or ATM host-site access, or a hybrid mix of Frame Relay and ATM, may implement a third type of standard—FRF.8.1 Frame Relay/ATM Service Interworking translation mode (referred to simply as "translation mode")—in the DSLAM 210 and the terminating Frame Relay switch 340 in the service provider network 300. Alternatively, the translation mode functionality may be implemented solely in the DSLAM 210 if the destination for the traffic is solely one or more ATM based customer networks. FRF.8.1 translation mode enables both Frame Relay and ATM data encapsulation without regard for the communication protocol used by the underlying WAN access (i.e service provider) network 300. Using a DSLAM with translation mode capability, the end user CPE devices 120 and 121 can send traffic to the Frame Relay terminating point 430 or the ATM terminating point 450 simultaneously over multiple PVCs.

Figure 4:
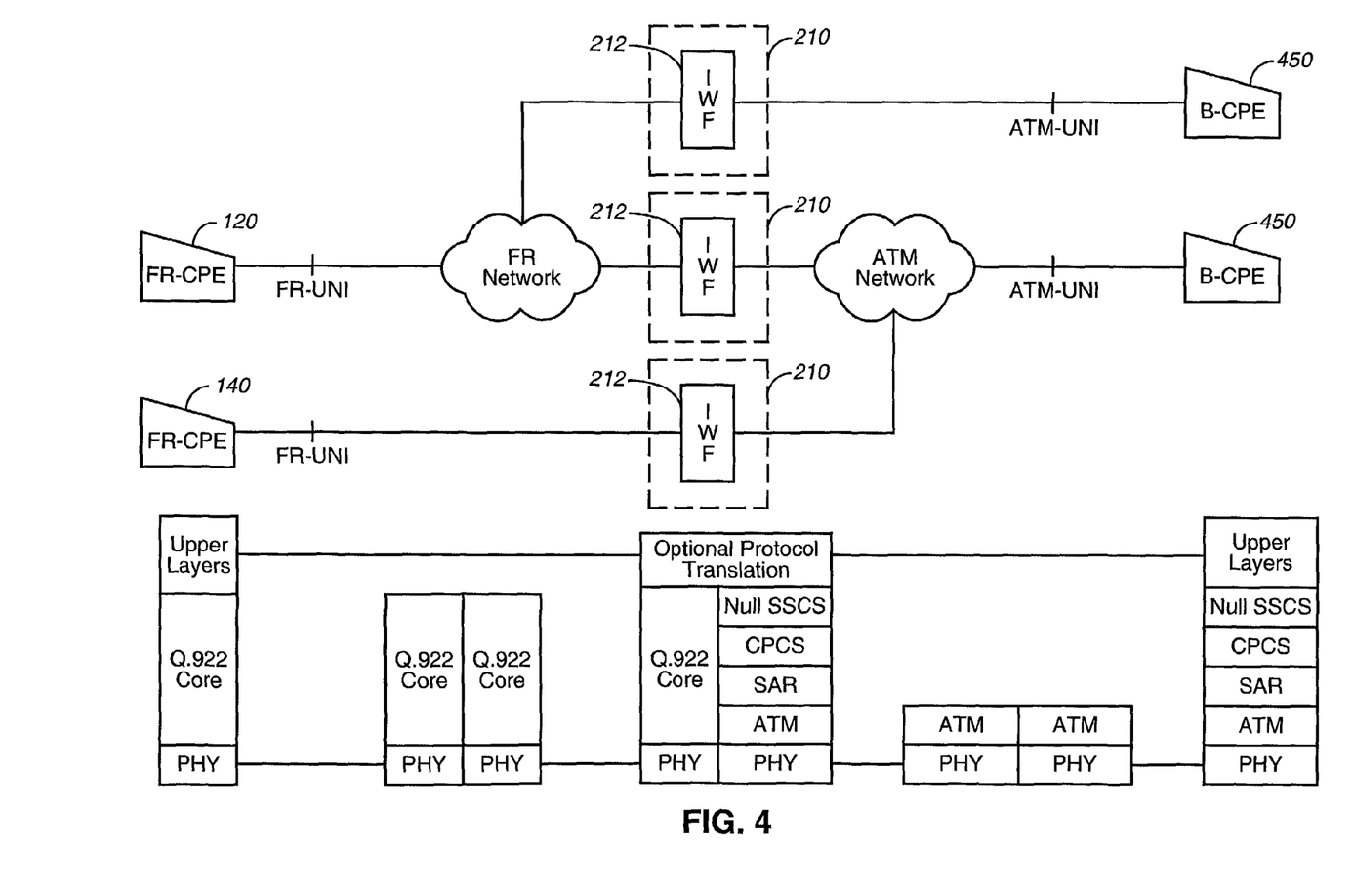
FIG. 4 is a schematic diagram further illustrating an embodiment of the invention.

FIG. 4 illustrates a service interworking example between Frame Relay networks and ATM networks. The upper portion of FIG. 4 shows the physical connection of network components, while the bottom portion of FIG. 4 shows the corresponding communication layers involved for each link of the network. More specifically, FIG. 4 illustrates the service interworking between Frame Relay CPE devices 120 and 140, the DSLAMS 210 and the ATM terminating point 450 shown in FIG. 2. The translation mode may be used when a Frame Relay end users connected to the CPE devices 120 or 140 interact with an ATM based terminating point 450 and the ATM terminating point performs no Frame Relay specific functions, and the Frame Relay CPE devices perform no ATM service specific functions. All interworking is performed by the Interworking Function 212 implemented in the DSLAMs 210. The Interworking Function converts the Q.922 Frame Relay frames to and from the ATM AAL5 PDUs.

Another scenario where translation mode may be used is in the interworking between the CPE devices 120 or 140 and the Frame Relay based terminating point 440. In this scenario the Interworking Function is carried out between the DSLAM 210 and the Frame Relay capable switch 340 (shown in FIG. 2). With reference to FIG. 2, the Frame Relay capable switch 340 re-encapsulates the data back to Frame Relay frames and sends the traffic to the customer Frame Relay capable switch 410 and then to the customer Frame Relay terminating point 440. This scenario might be used if the service provider wants to use the same type of configuration for all of the end users of the customer in the service provider network 300.

It will be apparent to those skilled in the art that various modifications and variations may be made in the preparation and configuration of the present invention without departing from the scope and spirit of the present invention. Thus, it is intended that the present invention cover all of the modifications and variations of the invention so long as they come within the scope of the following claims.

What is claimed is:

1. A system for transmitting a Frame Relay based communication over an Asynchronous Transfer Mode (ATM) based network that includes a Digital Subscriber Line (DSL) link, comprising:
   a Digital Subscriber Line Access Multiplexer (DSLAM) operatively connected to a Customer Premises Equipment (CPE) device, the DSLAM operatively connecting to an ATM network; and
   a Frame Relay capable switch connected to the ATM network,
   wherein the DSLAM is adapted to map Frame Relay based communication frames into ATM cells for transmission over the ATM network.

2. The system of claim 1, wherein the Frame Relay capable switch is adapted to convert the Frame Relay based communication mapped into ATM cells back into Frame Relay based communication frames.

3. The system of claim 1 wherein the CPE device comprises an xDSL router.

4. The system of claim 1 wherein the CPE device comprises an xDSL compatible Data Service Unit (DSU).

5. The system of claim 1 wherein the DSLAM is adapted to map Frame Relay based communication frames into ATM cells in accordance with an FRF.5 standard.

6. The system of claim 1 wherein the DSLAM is adapted to map Frame Relay based communication frames into ATM cells in accordance with an FRF.8 standard.

7. A method comprising:
   receiving a Frame Relay based communication from a Digital Subscriber Line (DSL) compatible Customer Premises Equipment (CPE) device at a Digital Subscriber Line Access Multiplexer (DSLAM);
   mapping the Frame Relay based communication into Asynchronous Transfer Mode (ATM) cells at the DSLAM; and
   transmitting, via the DSLAM, the ATM cells across an ATM network to a Frame Relay capable switch.

8. A method comprising:

receiving a Frame Relay based communication from a Digital Subscriber Line (DSL) compatible Customer Premises Equipment (CPE) device at a Digital Subscriber Line Access Multiplexer (DSLAM);

mapping the Frame Relay based communication into Asynchronous Transfer Mode (ATM) cells at the DSLAM;

transmitting, via the DSLAM, the ATM cells across an ATM network to an ATM capable switch.

9. The method of claim 7 further comprising:

recovering the Frame Relay based communication from the ATM cells at the Frame Relay capable switch.

10. The method of claim 7 wherein the mapping includes:

mapping the Frame Relay based communication frames into ATM cells in accordance with an FRF.5 standard.

11. The method of claim 7 wherein the mapping includes:

mapping the Frame Relay based communication frames into ATM cells in accordance with an FRF.8 standard.

12. The method of claim 7 wherein the mapping includes:

mapping the Frame Relay based communication frames into ATM cells in accordance with an FRF.8.1 standard.

13. The method of claim 7 wherein the mapping is transparent to the DSL compatible CPE device.

14. The method of claim 8 further comprising:

recovering the Frame Relay based communication from the ATM cells at the ATM capable switch.

15. The method of claim 8 wherein the mapping includes:

mapping the Frame Relay based communication frames into ATM cells in accordance with an FRF.5 standard.

16. The method of claim 8 wherein the mapping includes:

mapping the Frame Relay based communication frames into ATM cells in accordance with an FRF.8 standard.

17. The method of claim 8 wherein the mapping includes:

mapping the Frame Relay based communication frames into ATM cells in accordance with an FRF.8.1 standard.

18. The method of claim 8 wherein the mapping is transparent to the DSL compatible CPE device.

* * * * *